United States Patent
Telefus (10) Patent No.: US 9,843,212 B2
(45) Date of Patent: Dec. 12, 2017

(54) NO LOAD DETECTION

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 119 days.

(21) Appl. No.: 13/924,402

(22) Filed: Jun. 21, 2013

(65) Prior Publication Data
US 2014/0268955 A1    Sep. 18, 2014

Related U.S. Application Data

(60) Provisional application No. 61/799,124, filed on Mar. 15, 2013.

(51) Int. Cl.
*H02M 3/335* (2006.01)
*H02J 7/02* (2016.01)
(Continued)

(52) U.S. Cl.
CPC ............. *H02J 7/025* (2013.01); *H02J 50/10* (2016.02); *H02J 50/12* (2016.02);
(Continued)

(58) Field of Classification Search
CPC ..... H02M 3/33507; H02M 2003/1566; H02M 1/32; H02M 2001/0032;
(Continued)

(56) References Cited

U.S. PATENT DOCUMENTS

| | | |
|---|---|---|
| 4,077,061 A | 2/1978 | Johnston |
| 4,122,359 A | 10/1978 | Breikss |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Timothy J Dole
*Assistant Examiner* — Bryan R Perez
(74) *Attorney, Agent, or Firm* — Haverstock & Owens LLP (57) ABSTRACT

A power regulation control circuit is implemented as part of a power converter. The power regulation control circuit is implemented during two modes, a sleep mode and a wake-up mode. During the sleep mode, the power regulation control circuit detects a no-load presence and artificially increases the output voltage Vout to its maximum allowable value. This can be accomplished by pulling up an output of an error amplifier that feeds a PWM module. During the wake-up mode while the power converter wakes up from the sleep mode under maximum load, the output voltage Vout sinks from the artificially higher voltage, but still stays above a minimum operational voltage level. A slew rate compensation can be implemented to control a rate at which the output voltage drops when a load is applied. The artificially high output voltage during no-load condition and the slew rate compensation provide open loop voltage adjustment.

22 Claims, 5 Drawing Sheets

(51) Int. Cl.
*H04B 5/00* (2006.01)
*H02J 50/12* (2016.01)
*H02J 50/10* (2016.01)
*H03K 17/00* (2006.01)
*H02M 3/28* (2006.01)

(52) U.S. Cl.
CPC ........ *H02M 3/33507* (2013.01); *H03K 17/00* (2013.01); *H04B 5/0037* (2013.01); *H02M 3/28* (2013.01); *H02M 3/335* (2013.01)

(58) Field of Classification Search
CPC ..... H02M 2001/0035; H02M 3/33538; H02M 3/33546; H02M 3/33515; H02M 3/33576; H02M 3/33592; H02M 3/33553
USPC .. 363/21.12, 21.14, 20, 21.04, 21.05, 21.07, 363/21.08, 21.09
See application file for complete search history.

(56) References Cited

U.S. PATENT DOCUMENTS

| | | | |
|---|---|---|---|
| 4,234,920 A | 11/1980 | VanNess | |
| 4,245,289 A | 1/1981 | Mineck | |
| 4,273,406 A | 6/1981 | Okagami | |
| 4,327,298 A | 4/1982 | Burgen | |
| 4,370,703 A | 1/1983 | Risberg | |
| 4,381,457 A | 4/1983 | Wiles | |
| 4,489,394 A | 12/1984 | Borg | |
| 4,535,410 A | 8/1985 | O'Mara | |
| 4,563,731 A | 1/1986 | Sato et al. | |
| 4,607,323 A | 8/1986 | Sokal | |
| 4,611,289 A | 9/1986 | Coppola | |
| 4,642,616 A | 2/1987 | Goodwin | |
| 4,645,278 A | 2/1987 | Yevak et al. | |
| 4,658,204 A | 4/1987 | Goodwin | |
| 4,703,191 A | 10/1987 | Ferguson | |
| 4,712,160 A | 12/1987 | Sato et al. | |
| 4,742,424 A | 5/1988 | Kautzer | |
| 4,750,040 A | 6/1988 | Hakamada | |
| 4,788,626 A | 11/1988 | Neidig et al. | |
| 4,806,110 A | 2/1989 | Lindeman | |
| 4,837,495 A * | 6/1989 | Zansky | 323/222 |
| 4,841,220 A | 6/1989 | Tabisz et al. | |
| 4,857,822 A | 8/1989 | Tabisz et al. | |
| 4,866,367 A | 9/1989 | Ridley et al. | |
| 4,884,242 A | 11/1989 | Lacy | |
| 4,890,217 A | 12/1989 | Conway | |
| 4,893,227 A | 1/1990 | Gallios et al. | |
| 4,899,256 A | 2/1990 | Sway-Tin | |
| 4,901,069 A | 2/1990 | Veneruso | |
| 4,985,804 A | 1/1991 | Campbell | |
| 5,065,302 A | 11/1991 | Kanazawa | |
| 5,090,919 A | 2/1992 | Tsuji | |
| 5,101,322 A | 3/1992 | Ghaem et al. | |
| 5,105,182 A | 4/1992 | Shindo | |
| 5,126,931 A | 6/1992 | Jitaru | |
| 5,132,890 A | 7/1992 | Blandino | |
| 5,235,491 A | 8/1993 | Weiss | |
| 5,283,792 A | 2/1994 | Davies, Jr. | |
| 5,325,283 A | 6/1994 | Farrington | |
| 5,365,403 A | 11/1994 | Vinciarelli et al. | |
| 5,373,432 A | 12/1994 | Vollin | |
| 5,434,768 A | 7/1995 | Jitaru et al. | |
| 5,437,040 A | 7/1995 | Campbell | |
| 5,442,540 A | 8/1995 | Hua | |
| 5,673,185 A | 9/1997 | Albach et al. | |
| 5,712,772 A | 1/1998 | Telefus et al. | |
| 5,717,936 A | 2/1998 | Uskali | |
| 5,724,026 A | 3/1998 | Allen | |
| 5,786,992 A | 7/1998 | Vinciarelli et al. | |
| 5,790,395 A | 8/1998 | Hagen | |
| 5,811,895 A | 9/1998 | Suzuki et al. | |
| 5,838,171 A | 11/1998 | Davis | |
| 5,838,554 A | 11/1998 | Lanni | |
| 5,859,771 A | 1/1999 | Kniegl | |
| 5,903,452 A * | 5/1999 | Yang | 363/97 |
| 5,905,369 A | 5/1999 | Ishii et al. | |
| 5,923,543 A | 7/1999 | Choi | |
| 5,949,672 A | 9/1999 | Bernet | |
| 5,974,551 A | 10/1999 | Lee | |
| 5,978,238 A | 11/1999 | Liu | |
| 6,009,008 A | 12/1999 | Pelly | |
| 6,038,155 A | 3/2000 | Pelly | |
| 6,091,611 A | 7/2000 | Lanni | |
| 6,183,302 B1 | 2/2001 | Daikuhara et al. | |
| 6,191,957 B1 | 2/2001 | Peterson | |
| 6,272,015 B1 | 8/2001 | Mangtani | |
| 6,275,397 B1 | 8/2001 | McClain | |
| 6,301,133 B1 | 10/2001 | Cuadra | |
| 6,307,761 B1 | 10/2001 | Nakagawa | |
| 6,323,627 B1 | 11/2001 | Schmiederer et al. | |
| 6,333,650 B1 | 12/2001 | Amijn | |
| 6,356,465 B2 | 3/2002 | Yasmura | |
| 6,366,476 B1 | 4/2002 | Yasmura | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,452,816 B2 | 9/2002 | Kuranki | |
| 6,459,175 B1 | 10/2002 | Potega | |
| 6,466,460 B1 | 10/2002 | Rein | |
| 6,480,809 B1 | 11/2002 | Slaight | |
| 6,487,098 B2 | 11/2002 | Malik et al. | |
| 6,535,996 B1 | 3/2003 | Brewer | |
| 6,549,409 B1 | 4/2003 | Saxelby et al. | |
| 6,578,253 B1 | 6/2003 | Herbert | |
| 6,721,192 B1 | 4/2004 | Yang et al. | |
| 6,768,222 B1 | 7/2004 | Ricks | |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,215,560 B2 | 5/2007 | Soldano | |
| 7,239,532 B1 | 7/2007 | Hsu et al. | |
| 7,274,175 B2 | 9/2007 | Manolescu | |
| 7,315,460 B2 | 1/2008 | Kyono | |
| 7,386,286 B2 | 6/2008 | Petrovic et al. | |
| 7,395,452 B2 | 7/2008 | Nicholson | |
| 7,450,388 B2 | 11/2008 | Beihoff et al. | |
| 7,564,706 B1 | 7/2009 | Herbert | |
| 7,596,007 B2 | 9/2009 | Phadke | |
| 7,659,678 B2 | 2/2010 | Maiocchi | |
| 7,679,347 B2 | 3/2010 | He | |
| 7,701,305 B2 | 4/2010 | Lin et al. | |
| 7,724,555 B1 | 5/2010 | Simopoulos | |
| 7,830,684 B2 | 11/2010 | Taylor | |
| 7,924,578 B2 | 4/2011 | Jansen et al. | |
| 7,982,415 B2 | 7/2011 | Kimura | |
| 8,018,743 B2 | 9/2011 | Wang | |
| 8,059,429 B2 * | 11/2011 | Huynh | 363/18 |
| 8,059,434 B2 | 11/2011 | Huang et al. | |
| 8,102,678 B2 | 1/2012 | Jungreis | |
| 8,125,181 B2 | 2/2012 | Gregg et al. | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,159,843 B2 * | 4/2012 | Lund et al. | 363/56.01 |
| 8,193,662 B1 | 6/2012 | Carlson | |
| 8,194,417 B2 | 6/2012 | Chang | |
| 8,207,717 B2 | 6/2012 | Uruno et al. | |
| 8,233,298 B2 | 7/2012 | Jang | |
| 8,243,472 B2 | 8/2012 | Chang et al. | |
| 8,274,268 B2 | 9/2012 | Yen | |
| 8,344,689 B2 | 1/2013 | Boguslavskij | |
| 8,369,111 B2 | 2/2013 | Balakrishnan et al. | |
| 8,400,801 B2 | 3/2013 | Shinoda | |

(56) References Cited

U.S. PATENT DOCUMENTS

| | | | |
|---|---|---|---|
| 8,654,553 B1 | 2/2014 | Ye | |
| 8,770,597 B1 | 7/2014 | Xu | |
| 9,007,087 B2 | 4/2015 | Avritch | |
| 9,048,028 B2 | 6/2015 | Tajima | |
| 2001/0036091 A1 | 11/2001 | Yasmura | |
| 2002/0008963 A1 | 1/2002 | Dibene et al. | |
| 2002/0011823 A1 | 1/2002 | Lee | |
| 2002/0036200 A1 | 3/2002 | Ulrich et al. | |
| 2002/0121882 A1 | 9/2002 | Matsuo | |
| 2003/0035303 A1 | 2/2003 | Balakrishnan et al. | |
| 2003/0112645 A1 | 6/2003 | Schlecht | |
| 2003/0128018 A1* | 7/2003 | Telefus et al. | 323/284 |
| 2004/0183510 A1 | 9/2004 | Sutardja et al. | |
| 2004/0255259 A1 | 12/2004 | Huber et al. | |
| 2005/0024016 A1 | 2/2005 | Breen et al. | |
| 2005/0036338 A1 | 2/2005 | Porter et al. | |
| 2005/0077883 A1* | 4/2005 | Walters | H02M 3/156 323/273 |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0218942 A1* | 10/2005 | Yamashita | H02M 3/33523 327/108 |
| 2005/0225257 A1 | 10/2005 | Green | |
| 2005/0254268 A1 | 11/2005 | Reinhard et al. | |
| 2006/0002155 A1 | 1/2006 | Shteynberg et al. | |
| 2006/0022637 A1 | 2/2006 | Wang et al. | |
| 2006/0146461 A1 | 7/2006 | Jones | |
| 2006/0152947 A1 | 7/2006 | Baker et al. | |
| 2006/0198172 A1 | 9/2006 | Wood | |
| 2006/0208711 A1 | 9/2006 | Soldano | |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0087784 A1 | 4/2007 | Yamamoto et al. | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0242487 A1 | 10/2007 | Orr | |
| 2007/0247091 A1 | 10/2007 | Maiocchi | |
| 2007/0263415 A1 | 11/2007 | Jansen et al. | |
| 2007/0279955 A1 | 12/2007 | Liu | |
| 2008/0002444 A1 | 1/2008 | Shekhawat | |
| 2008/0018265 A1 | 1/2008 | Lee et al. | |
| 2008/0043496 A1 | 2/2008 | Yang | |
| 2008/0130322 A1 | 6/2008 | Artusi | |
| 2008/0191667 A1 | 8/2008 | Kernahan et al. | |
| 2009/0034299 A1 | 2/2009 | Lev | |
| 2009/0045889 A1 | 2/2009 | Goergen et al. | |
| 2009/0089604 A1 | 4/2009 | Malik | |
| 2009/0168472 A1 | 7/2009 | Chung | |
| 2009/0196073 A1 | 8/2009 | Nakahori | |
| 2009/0207637 A1 | 8/2009 | Boeke | |
| 2009/0268487 A1* | 10/2009 | Park | 363/21.12 |
| 2009/0290384 A1 | 11/2009 | Jungreis | |
| 2009/0300400 A1 | 12/2009 | DuBose | |
| 2010/0008109 A1* | 1/2010 | Morota | 363/21.16 |
| 2010/0039833 A1 | 2/2010 | Coulson et al. | |
| 2010/0066328 A1 | 3/2010 | Shimizu et al. | |
| 2010/0103711 A1 | 4/2010 | Komatsuzaki | |
| 2010/0195355 A1* | 8/2010 | Zheng | H02M 3/33507 363/21.12 |
| 2010/0250457 A1 | 9/2010 | Chen | |
| 2010/0253310 A1 | 10/2010 | Fonderie | |
| 2010/0254057 A1 | 10/2010 | Chen | |
| 2010/0277837 A1 | 11/2010 | Myhre | |
| 2010/0289466 A1 | 11/2010 | Telefus et al. | |
| 2010/0315847 A1 | 12/2010 | Maher | |
| 2010/0317216 A1 | 12/2010 | Pocrass | |
| 2010/0322441 A1 | 12/2010 | Weiss et al. | |
| 2010/0332857 A1 | 12/2010 | Vogman | |
| 2011/0037444 A1 | 2/2011 | Wildash | |
| 2011/0112700 A1 | 5/2011 | Tajima | |
| 2011/0127981 A1 | 6/2011 | Miyamae | |
| 2011/0132899 A1 | 6/2011 | Shimomugi et al. | |
| 2011/0211376 A1 | 9/2011 | Hosotani | |
| 2011/0213999 A1 | 9/2011 | Lecourtier | |
| 2011/0215647 A1 | 9/2011 | Lecourtier | |
| 2011/0222318 A1 | 9/2011 | Uno | |
| 2011/0261590 A1 | 10/2011 | Liu | |
| 2012/0002451 A1* | 1/2012 | Djenguerian et al. | 363/78 |
| 2012/0069609 A1* | 3/2012 | Christophe et al. | 363/21.12 |
| 2012/0112657 A1 | 5/2012 | Van Der Veen et al. | |
| 2012/0113692 A1 | 5/2012 | Telefus | |
| 2012/0333686 | 5/2012 | Telefus et al. | |
| 2012/0144183 A1 | 6/2012 | Heinrichs | |
| 2012/0153917 A1 | 6/2012 | Adell | |
| 2012/0176820 A1* | 7/2012 | Li et al. | 363/21.12 |
| 2013/0003427 A1 | 1/2013 | Pan | |
| 2013/0016545 A1 | 1/2013 | Xu | |
| 2013/0033905 A1* | 2/2013 | Lin et al. | 363/21.13 |
| 2013/0155728 A1 | 6/2013 | Melanson | |
| 2013/0194836 A1* | 8/2013 | Morris et al. | 363/21.14 |
| 2013/0215649 A1* | 8/2013 | Huang et al. | 363/21.17 |
| 2013/0250629 A1* | 9/2013 | Xu | H02M 3/33523 363/21.17 |
| 2013/0265807 A1 | 10/2013 | Lee et al. | |
| 2013/0329469 A1 | 12/2013 | Kubota | |
| 2014/0008979 A1 | 1/2014 | Kinnard | |
| 2014/0091839 A1 | 4/2014 | Peters et al. | |
| 2014/0211515 A1 | 7/2014 | Sokal | |
| 2014/0268912 A1* | 9/2014 | Telefus | 363/21.12 |
| 2014/0268955 A1 | 9/2014 | Telefus | |
| 2015/0052390 A1 | 2/2015 | Dryer | |
| 2016/0025793 A1 | 1/2016 | Oestreicher | |

FOREIGN PATENT DOCUMENTS

| | | | |
|---|---|---|---|
| JP | 11202027 A | 7/1999 | |
| JP | 2000083374 A | 3/2000 | |
| JP | 20000253648 A | 9/2000 | |
| JP | 2004208357 A | 7/2004 | |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

Non-Final Office Action, dated Apr. 6, 2017, U.S. Appl. No. 14/821,449, filed Aug. 7, 2015, Applicant: Mark Telefus, 36 pages.

Non-Final Office Action dated Jul. 21, 2016. U.S. Appl. No. 13/924,388, filed Jun. 21, 2013, 16 pages.

* cited by examiner

NO LOAD DETECTION

RELATED APPLICATIONS

This Patent Application claims priority under 35 U.S.C. 119 (e) of the U.S. Provisional Application Ser. No. 61/799,124, filed Mar. 15, 2013, and entitled "New Power Management Integrated Circuit Partitioning With Dedicated Primary Side Control Winding". This application incorporates U.S. Provisional Application Ser. No. 61/799,124 in its entirety by reference.

FIELD OF THE INVENTION

The present invention is generally directed to the field of power converters. More specifically, the present invention is directed to power regulation control particularly during device wake-up under load.

BACKGROUND OF THE INVENTION

In many applications a power converter is required to provide a voltage within a predetermined range formed from a voltage source having a different voltage level. Some circuits are subject to uncertain and undesirable functioning and even irreparable damage if supplied power falls outside a certain range. More specifically, in some applications, a precise amount of power is required at known times. This is referred to as regulated power supply.

In order to control a power converter to deliver a precise amount of power as conditions require, some form of control of the power converter is required. This control can occur on the primary side of an isolation transformer or the secondary side. A closed loop feedback control system is a system that monitors some element in the circuit, such as the circuit output voltage, and its tendency to change, and regulates that element at a substantially constant value. Control on the secondary side of a power converter can use a monitored output voltage as feedback control, but requires the use of some communication from the secondary to the primary side of the isolation transformer to control the primary side switching element. Control on the primary side can readily control the primary side switching element, but requires some feedback mechanism from the secondary side to the primary side to convey the status of the monitored element.

Figure 1:
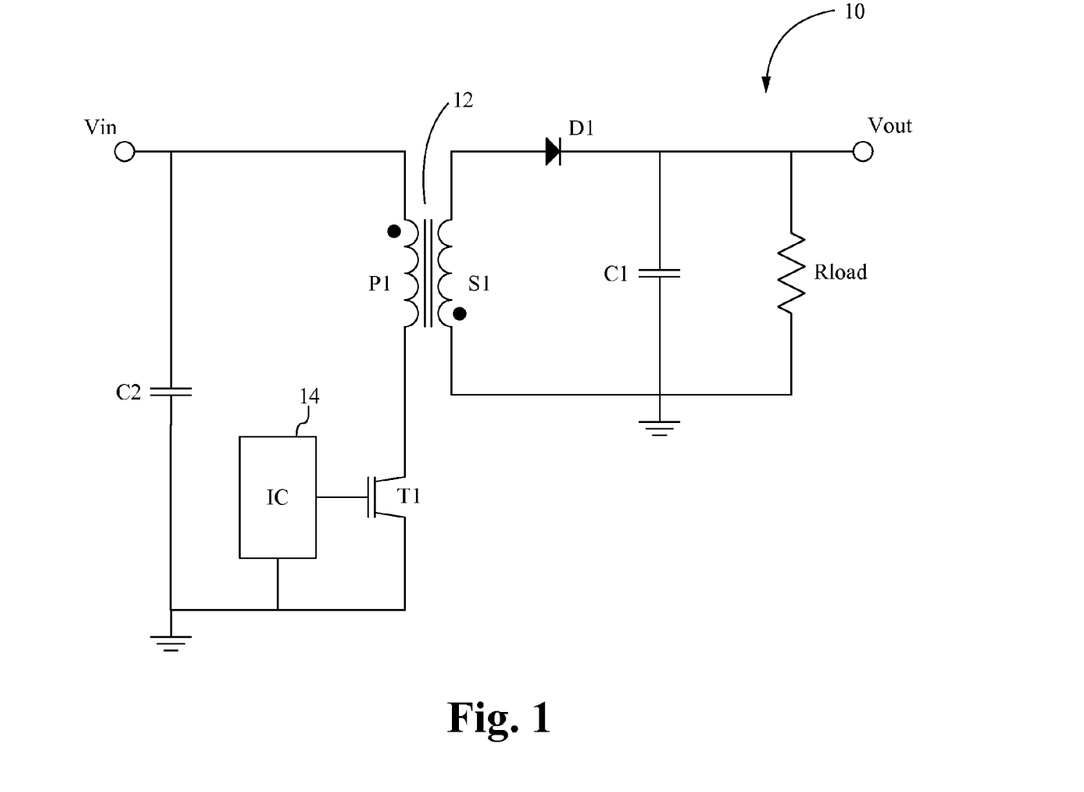
FIG. 1 illustrates a conventional flyback type voltage converter.

FIG. 1 illustrates a conventional flyback type voltage converter. The converter 10 includes a transistor T1, a controller 14, a transformer 12, a capacitor C1, and a diode D1. Input voltage to the circuit may be unregulated DC voltage derived from an AC supply after rectification and filtering. The transistor T1 is a fast-switching device, such as a MOSFET, the switching of which is controlled by a fast dynamic controller 14 to maintain a desired regulated output voltage Vout. The secondary winding voltage is rectified and filtered using the diode D1 and the capacitor C1. The transformer 12 of the flyback converter functions differently than a typical transformer. Under load, the primary and secondary windings of a typical transformer conduct simultaneously. However, in the flyback converter, the primary and secondary windings of the transformer do not carry current simultaneously. In operation, when the transistor T1 is turned ON, the primary winding P1 of the transformer 12 is connected to the input supply voltage such that the input supply voltage appears across the primary winding P1, resulting in an increase of magnetic flux in the transformer 12 and the primary winding current rises linearly. However, with the transistor T1 turned ON, the diode D1 is reverse biased and there is no current through the secondary winding S1. Even though the secondary winding S1 does not conduct current while the transistor T1 is turned ON, the load, represented as resistor Rload, coupled to the capacitor C1 receives uninterrupted current due to previously stored charge on the capacitor C1.

When the transistor T1 is turned OFF, the primary winding current path is broken and the voltage polarities across the primary and secondary windings reverse, making the diode D1 forward biased. As such, the primary winding current is interrupted but the secondary winding S1 begins conducting current thereby transferring energy from the magnetic field of the transformer to the output of the converter. This energy transfer includes charging the capacitor C1 and delivery energy to the load. If the OFF period of the transistor T1 is sufficiently long, the secondary current has sufficient time to decay to zero and the magnetic field energy stored in the transformer 12 is completely dissipated.

To regulate the output voltage Vout, the output voltage or some representation of the output voltage, is provided to the controller 14. The controller 14 regulates a duty cycle of a pulse width modulation (PWM) signal used to drive the main switch, the transistor T1. The output voltage Vout is regulated by adjusting the duty cycle of the PWM signal.

Figure 2:
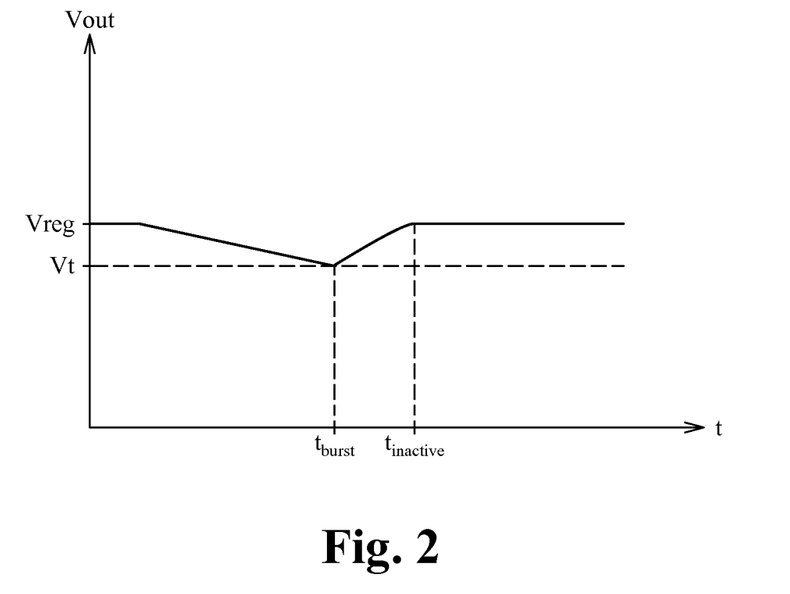
FIG. 2 illustrates an exemplary output voltage while the power converter is in sleep mode.

A significant consideration of power converter design is to minimize power consumption under no load condition. This is typically achieved by putting the power converter into a low power mode, often referred to as a standby mode or a sleep mode, when a no load condition is detected. In normal operation, the main switch is turned ON and OFF at a high switching rate under control of the controller to maintain the regulated output voltage Vout. In sleep mode, the power converter operates in a burst mode. The PWM signal drives the main switch ON and OFF for a brief period, such as a few microseconds, followed by a longer period of inactivity where the main switch is turned OFF, such as for a few milliseconds. As shown in FIG. 2, during periods of inactivity, the output voltage Vout decays until it reaches a threshold value Vt, which represents a minimum operational voltage, at which point the power converter is active (time tburst) to deliver power to the output, thereby increasing the output voltage Vout back to the normal regulated value. Once the output voltage Vout increases to the desired level, such as the regulated voltage, the power converter resumes its inactive status, at time tinactive in FIG. 2.

Figure 3:
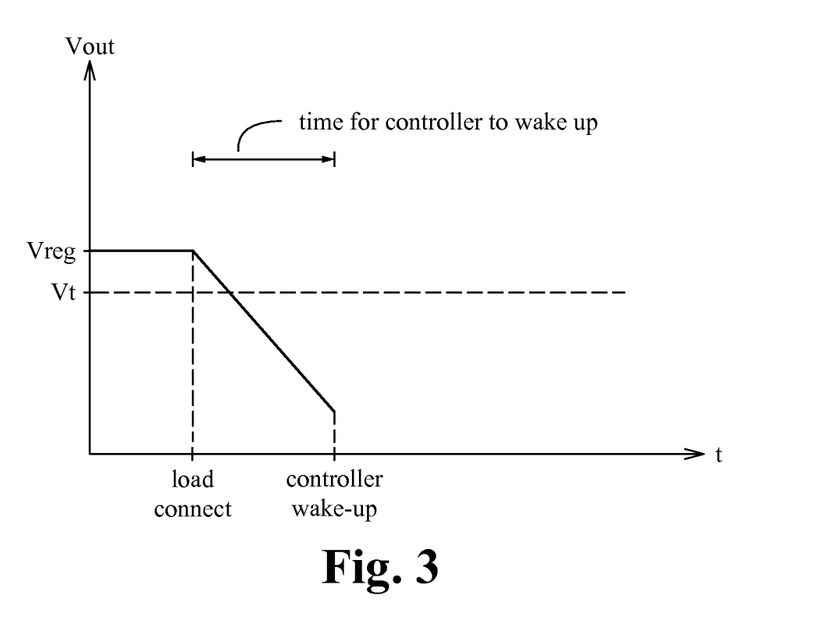
FIG. 3 illustrates an exemplary output voltage before and after a load is applied to the power converter while in sleep mode.

When a load is connected while the controller is in sleep mode, the load draws from the output capacitor, thereby depleting the capacitor because the sleep mode is only providing short duration bursts of power. The initial response to the connected load is to sink a large amount of voltage which results in a drop of the output voltage that is supposed to be regulated. The controller requires some period of time to come out of sleep mode, but during this time period the connected load draws down the output voltage Vout below the threshold voltage Vt, as shown in FIG. 3. With the output voltage Vout below the threshold voltage, the voltage is out of regulation and the connected load determines insufficient power and shuts down or provides an error message. This is a deficiency of the sleep mode of operation. In conventional power converters, to keep the output voltage in regulation under transition from sleep mode to wake-up, an excessive output capacitor is required to keep output voltage form sinking below the threshold voltage Vt, which presents a huge inertia to the transient response.

SUMMARY OF THE INVENTION

A power regulation control circuit is implemented as part of a power converter. The power regulation control circuit is implemented during two modes, a sleep mode and a wake-up mode. During the sleep mode, the power regulation control circuit detects a no-load presence and artificially increases the output voltage Vout to its maximum allowable value. In some embodiments, this is accomplished by pulling up an output of an error amplifier that feeds a PWM module. During the wake-up mode while the power converter wakes up from the sleep mode under maximum load, the output voltage Vout sinks from the artificially higher voltage, but still stays above a minimum operational voltage level. A slew rate compensation can be implemented to control a rate at which the output voltage drops when a load is applied. The artificially high output voltage during no-load condition and the slew rate compensation provide open loop voltage adjustment.

In an aspect, a method of controlling an output voltage level of a power converter is disclosed. The method includes determining between a load condition and a no-load condition at an output of the power converter. When a no-load condition is detected, the output voltage level is artificially raised above a regulated output voltage level. When a load condition is detected, regulation of the output voltage at the regulated output voltage level is resumed. In some embodiments, when the no-load condition is detected, the power converter enters a sleep mode of operation. In some embodiments, artificially raising the output voltage level includes raising the output voltage level within an acceptable operating voltage range and below an over voltage condition. In some embodiments, during a wake-up time period after a load is applied, the output voltage level drops from the raised output voltage level to an intermediate voltage level that is within the acceptable operating voltage range and above an under voltage condition. In some embodiments, the sleep mode of operation includes alternating periods of inactivity and burst periods of activity. In some embodiments, the method also includes implementing a slew rate compensation when the load condition is detected and until a controller of the power converter wakes-up. In some embodiments, implementing the slew rate compensation includes periodically pulling-up the output voltage level. In some embodiments, the output voltage level is periodically pulled-up according to a slope of an output voltage level drop while the load is detected and before the controller wakes-up.

In another aspect, another method of controlling an output voltage level of a power converter is disclosed. The method includes detecting a no-load condition at an output of the power converter and placing the power converter into a sleep mode of operation. The method also includes raising the output voltage level above a regulated output voltage level and when a load condition is detected, waking-up the power converter and resuming regulation of the output voltage at the regulated output voltage level. In some embodiments, raising the output voltage level includes raising the output voltage level within an acceptable operating voltage range and below an over voltage condition. In some embodiments, during a wake-up time period after a load is applied, the output voltage level drops from the raised output voltage level to an intermediate voltage level that is within the acceptable operating voltage range and above an under voltage condition. In some embodiments, the sleep mode of operation includes alternating periods of inactivity and burst periods of activity. In some embodiments, the method also includes implementing a slew rate compensation when the load condition is detected and until a controller of the power converter wakes-up. In some embodiments, implementing the slew rate compensation includes periodically pulling-up the output voltage level. In some embodiments, the output voltage level is periodically pulled-up according to a slope of an output voltage level drop while the load is detected and before the controller wakes-up.

In yet another aspect, a power converter for regulating an output voltage supplied to a load is disclosed. The power converter includes a power regulation control circuit configured to determine between a load condition and a no-load condition at an output of the power converter. When a no-load condition is detected, the power regulation control circuit is further configured to artificially raise the output voltage level above a regulated output voltage level, and when a load condition is detected, the power regulation control circuit is further configured to resume regulation of the output voltage at the regulated output voltage level. In some embodiments, the artificially raised output voltage level is within an acceptable operating voltage range and below an over voltage condition. In some embodiments, the power regulation control circuit is configured such that during a wake-up time period after a load is applied, the output voltage level drops from the raised output voltage level to an intermediate voltage level that is within the acceptable operating voltage range and above an under voltage condition. In some embodiments, the power regulation control circuit includes a slew rate compensation module configured to provide voltage adjustments to periodically pulling-up the output voltage level when the load condition is detected and until the power converter wakes-up. In some embodiments, the slew rate compensation module is configured to provide voltage adjustments according to a slope of an output voltage level drop while the load is detected and before the power converter wakes-up.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to power regulation control. Those of ordinary skill in the art will realize that the following detailed description of power regulation control is illustrative only and is not intended to be in any way limiting. Other embodiments of power regulation control will readily suggest themselves to such skilled persons having the benefit of this disclosure.

Reference will now be made in detail to implementations of power regulation control as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a power regulation control circuit are implemented as part of a power converter. The power regulation control circuit performs a sleep mode operation and a wake-up mode operation. The power regulation control circuit determines when a no-load condition exists and then enters the sleep mode of operation. The sleep mode of operation is a low-power operation mode characterized by alternating periods of inactivity and burst modes of activity. Upon entering the sleep mode, the power regulation control circuit prepares itself for an eventual load condition. No-load operation can be determined using any conventional means. In some embodiments, the means for determining the no-load condition are the same as conventional means for determining when the device goes into sleep mode.

Figure 4:
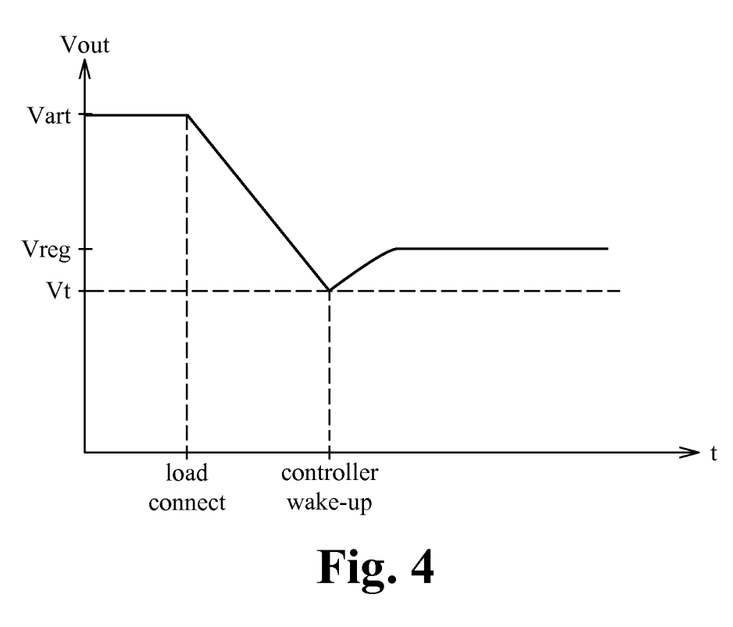
FIG. 4 illustrates an exemplary output voltage at an artificially high level before and after a load is applied to the power converter while in sleep mode.

When a no-load condition is detected and the sleep mode is entered, the output voltage is artificially changed to a higher value. This artificial setting makes the output voltage Vout higher than the standard regulated level Vreg, but within an acceptable operating voltage range. In an exemplary application, the standard regulated voltage level is 5V, and the artificial voltage level is set to 5.5V. Devices typically operate within an acceptable operating voltage range, for example between 4.85 V and 5.6V. Over 5.6V is considered an over voltage condition, and under 4.85V is considered an under voltage condition. Both the over voltage condition and the under voltage condition are considered error conditions. The output voltage level can be increased beyond the standard regulated level because no load is connected to the output. When a load is applied while in the sleep mode, the output voltage sinks before a controller of the power converter wakes up. By setting the output voltage level to an artificially high level Vart, the output voltage does not drop below the threshold voltage Vt for minimum regulation, since the voltage starts dropping from the artificially higher voltage value, as shown in FIG. 4. Setting the output voltage level to the artificially high level Vart provides additional time for the controller to wake-up and activate charging before the output voltage level Vout sinks below the minimum regulation voltage level. Once a load condition is established and the wake-up time period for the controller has elapsed, the power converter resumes normal voltage regulation at Vreg, such as 5V.

Setting the output voltage level to the artificially high level is effective when performed during a no-load condition. Simply increasing the regulated output voltage level to the high end of the operational voltage range, which would provide additional time for controller to wake-up during sleep mode, is ineffective because when in a load condition the output voltage level swings up and down, an upswing beginning from the high end of the operational voltage range would result in an over voltage condition.

Figure 5:
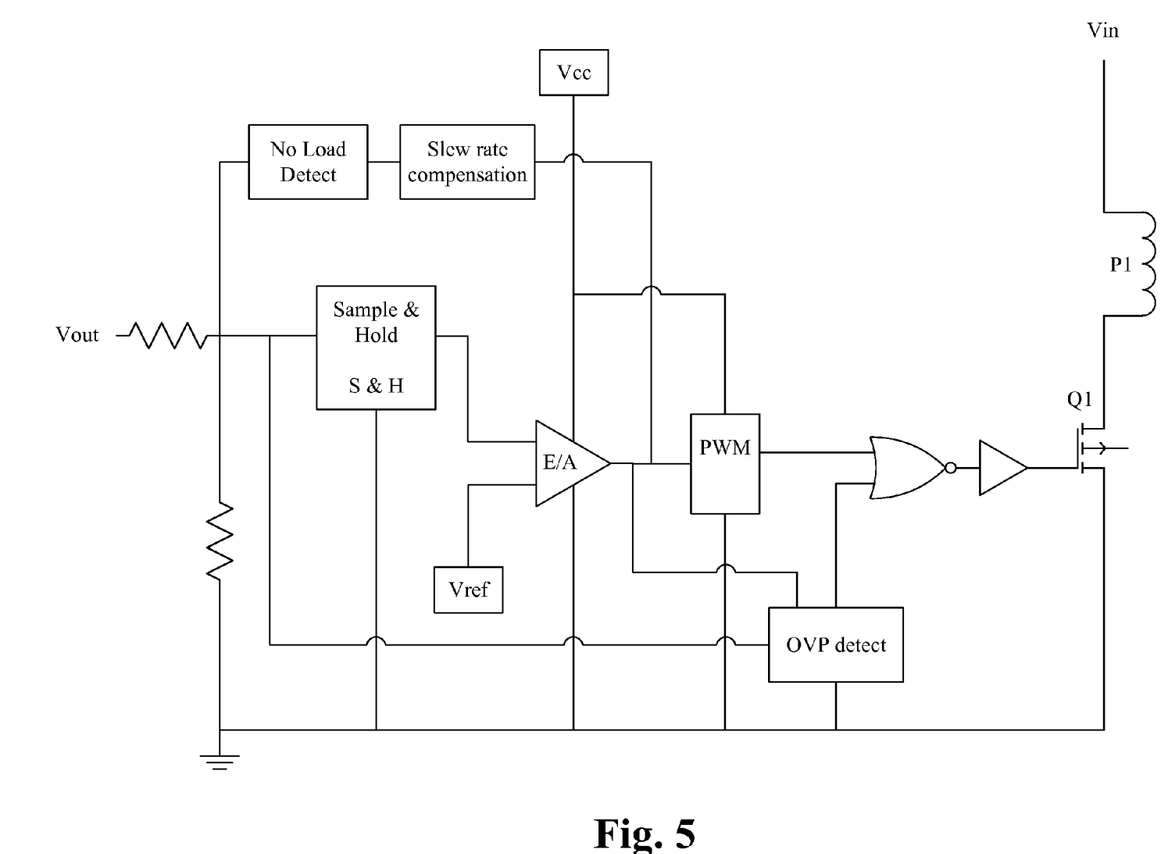
FIG. 5 illustrates an exemplary primary side of a power converter including a schematic block diagram of a power regulation control circuit according to an embodiment.

FIG. 5 illustrates an exemplary primary side of a power converter including a schematic block diagram of a power regulation control circuit according to an embodiment. In an exemplary implementation, the power regulation control circuit is implemented within a controller of a power converter. It is understood that the power regulation control circuit can be implemented separately from the controller. The output voltage Vout is provided to a primary side controller for regulation. Any conventional means can be used to provide the output voltage Vout, or any representation thereof, to the primary side controller. The controller is coupled to the main switch Q1, such as a MOSFET or other type of transistor. The main switch Q1 is coupled in series with the primary winding P1 of the power converter. The primary winding P1 is coupled to an input voltage Vin. The secondary side of the power converter is not shown in FIG. 5. It is understood that the power regulation control circuit can be applied to a variety of different types of power converter architectures. In an exemplary configuration, the power converter has a flyback type configuration and the secondary side of the power converter is configured similarly as the secondary side in FIG. 1.

A No Load Detect block determines a no-load condition at the output. When a no-load condition is detected, the output of the error amplifier (E/A) is pulled up high enough to turn ON the main switch Q1 using a different pulse width modulation mode than for standard regulation in order to increase the output voltage Vout to the higher artificial level, for example 5.5V. As soon as a load is detected, the output from the error amplifier is no longer pulled up and standard regulation, such as 5V, is resumed.

Figure 6:
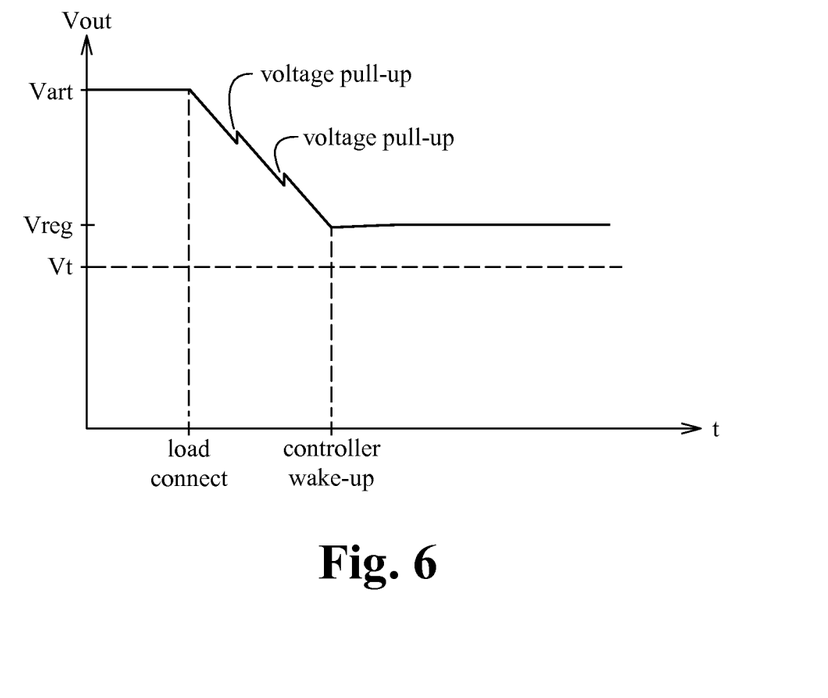
FIG. 6 illustrates an exemplary voltage output waveform with periodic slew rate compensation in the form of voltage pull-ups.

In some embodiments, a slew rate control is implemented during the wake-up period of the controller. Operation during this time period is referred to as the wake-up mode operation. When the load is applied while the power converter is in sleep mode, the output voltage will drop as described above. The slew rate control functions to decrease the rate at which the output voltage drops during this wake-up time period. So during the wake-up time period when the load is applied and the controller wakes-up, a slew rate compensation block monitors the output voltage drop and periodically performs an output voltage adjustment by pulling up the output of the error amplifier. FIG. 6 illustrates an exemplary voltage output waveform with period slew rate compensation in the form of voltage pull-ups. In this manner, by the time the controller wakes-up, the voltage output drop is not as much as if no slew rate compensation is implemented, as in FIG. 4. In this exemplary embodiment, the slew rate compensation is implemented along with the artificially high no-load output voltage. In other embodiments, the slew rate compensation is implemented without also using an artificially high no-load output voltage.

In an exemplary implementation, the artificial output voltage is set at 5.5V during sleep mode with no-load condition. When a load is applied the output voltage begins to drop to 5.1V, at which point the slew rate compensation pulls-up the output voltage to 5.3V. The output voltage continues to drop from 5.3V to 4.9V, when another slew rate compensation is implemented increasing the output voltage to 5.1V. This continues until the controller wakes-up.

The voltage supplied to the PWM module is periodically forced higher by the slew rate compensation block. This functions to increase the duty cycle of the PWM signal supplied to the main switch Q1. In some embodiments, the slew rate compensation is implemented using an RC time constant to mimic the slope of the output voltage drop due to load. Knowing the slope, the output voltage is periodically pulled up.

Implementation of the artificially high output voltage and the slew rate compensation occurs outside of the regulation feedback loop. These two techniques are open loop techniques.

These techniques can also be applied to compensate for voltage loss in the cable of the power supply.

The present application has been described in terms of specific embodiments incorporating details to facilitate the understanding of the principles of construction and operation of power regulation control. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling an output voltage level of a power converter, the method comprising:
    a. determining between a load condition and a no-load condition at an output of the power converter;
    b. when a no-load condition is detected, placing the power converter into a sleep mode of operation and controlling the output voltage level to an artificial output voltage level that is a set constant value above a regulated output voltage level and maintaining the artificial output voltage level at the constant value until a load condition is detected by actively driving a main switch of the power converter ON and OFF according to a burst mode of operation while in the sleep mode and the no-load condition; and
    c. when a load condition is detected, resuming regulation of the output voltage at the regulated output voltage level.

2. The method of claim 1 further comprising implementing a slew rate compensation when the load condition is detected and until a controller of the power converter wakes-up.

3. The method of claim 2 wherein implementing the slew rate compensation comprises periodically pulling-up the output voltage level.

4. The method of claim 3 wherein the output voltage level is periodically pulled-up according to a slope of an output voltage level drop while the load is detected and before the controller wakes-up.

5. The method of claim 1 wherein the artificial output voltage level is a constant value.

6. The method of claim 1 wherein artificially raising the output voltage level comprises raising the output voltage level within an acceptable operating voltage range and below an over voltage condition.

7. The method of claim 6 wherein during a wake-up time period after a load is applied, the output voltage level drops from the raised output voltage level to an intermediate voltage level that is within the acceptable operating voltage range and above an under voltage condition.

8. The method of claim 1 wherein the sleep mode of operation comprises alternating periods of inactivity and burst periods of activity.

9. A method of controlling an output voltage level of a power converter, the method comprising:
    a. detecting a no-load condition at an output of the power converter and placing the power converter into a sleep mode of operation;
    b. in response to detecting the no-load condition and placing the power converter into the sleep mode, controlling the output voltage level to an artificial output voltage level that is a set constant value above a regulated output voltage level and maintaining the artificial output voltage level at the constant value until a load condition is detected by actively driving a main switch of the power converter ON and OFF according to a burst mode of operation while in the sleep mode and the no-load condition; and
    c. when a load condition is detected, waking-up the power converter and resuming regulation of the output voltage at the regulated output voltage level.

10. The method of claim 9 wherein raising the output voltage level comprises raising the output voltage level within an acceptable operating voltage range and below an over voltage condition.

11. The method of claim 10 wherein during a wake-up time period after a load is applied, the output voltage level drops from the raised output voltage level to an intermediate voltage level that is within the acceptable operating voltage range and above an under voltage condition.

12. The method of claim 9 wherein the sleep mode of operation comprises alternating periods of inactivity and burst periods of activity.

13. The method of claim 9 further comprising implementing a slew rate compensation when the load condition is detected and until a controller of the power converter wakes-up.

14. The method of claim 13 wherein implementing the slew rate compensation comprises periodically pulling-up the output voltage level.

15. The method of claim 14 wherein the output voltage level is periodically pulled-up according to a slope of an output voltage level drop while the load is detected and before the controller wakes-up.

16. A power converter for regulating an output voltage supplied to a load, the power converter comprises a main switch and a power regulation control circuit configured to determine between a load condition and a no-load condition at an output of the power converter, wherein when a no-load condition is detected, the power regulation control circuit is further configured to place the power converter into a sleep mode of operation and controlling the output voltage level to an artificial output voltage level that is a set constant value above a regulated output voltage level and maintaining the artificial output voltage level at the constant value until a load condition is detected by actively driving the main switch ON and OFF according to a burst mode of operation while in the sleep mode and the no-load condition, and when a load condition is detected, the power regulation control circuit is further configured to resume regulation of the output voltage at the regulated output voltage level.

17. The power converter of claim 16 wherein the artificially raised output voltage level is within an acceptable operating voltage range and below an over voltage condition.

18. The power converter of claim 17 wherein the power regulation control circuit is configured such that during a wake-up time period after a load is applied, the output voltage level drops from the raised output voltage level to an intermediate voltage level that is within the acceptable operating voltage range and above an under voltage condition.

19. The power converter of claim 16 wherein the power regulation control circuit further comprises a slew rate compensation module configured to provide voltage adjustments to periodically pulling-up the output voltage level when the load condition is detected and until the power converter wakes-up.

20. The power converter of claim 19 wherein the slew rate compensation module is configured to provide voltage adjustments according to a slope of an output voltage level drop while the load is detected and before the power converter wakes-up.

21. A method of controlling an output voltage level of a power converter, the method comprising:
   a. determining between a load condition and a no-load condition at an output of the power converter;
   b. when a no-load condition is detected, placing the power converter into a sleep mode of operation and controlling the output voltage level to an artificial output voltage level that is above a regulated output voltage level and maintaining the artificial output voltage level until a load condition is detected by actively driving a main switch of the power converter ON and OFF according to a burst mode of operation, wherein the power converter further comprises an output of a signal modulator coupled to the main switch, an output of an error amplifier connected to an input of the signal modulator and an output of a no-load detection circuit coupled to the output of the error amplifier, further wherein an error signal is output from the error amplifier to the signal modulator and controlling the output voltage level to the artificial output voltage level and maintaining the artificial output voltage level comprises increasing a voltage level of the error signal by the output of the no-load detection circuit while in the sleep mode and the no-load condition; and
   c. when a load condition is detected, resuming regulation of the output voltage at the regulated output voltage level.

22. A power converter for regulating an output voltage supplied to a load, the power converter comprises a main switch and a power regulation control circuit including an output of a signal modulator coupled to the main switch, an output of an error amplifier connected to an input of the signal modulator and an output of a no-load detection circuit coupled to the output of the error amplifier, wherein an error signal is output from the error amplifier to the signal modulator, further wherein the power regulation control circuit is configured to determine between a load condition and a no-load condition at an output of the power converter, wherein when a no-load condition is detected, the power regulation control circuit is further configured to place the power converter into a sleep mode of operation, control the output voltage level to an artificial output voltage level that is above a regulated output voltage level and maintain the artificial output voltage level until a load condition is detected by increasing a voltage level of the error signal by the no-load detection circuit while in the sleep mode and the no-load condition and by actively driving the main switch ON and OFF according to a burst mode of operation, and when a load condition is detected, the power regulation control circuit is further configured to resume regulation of the output voltage at the regulated output voltage level.

* * * * *